United States Patent [19]

Pabich et al.

[11] 3,727,821

[45] Apr. 17, 1973

[54] TOOL FOR ATTACHING IMPROVED WING HEADED FASTENERS

[75] Inventors: Richard W. Pabich; Richard W. Trieber, both of Chicago, Ill.

[73] Assignee: Acme Lane Co., Inc., Chicago, Ill.

[22] Filed: Nov. 21, 1968

[21] Appl. No.: 777,652

Related U.S. Application Data

[63] Continuation-in-part of Ser. Nos. 615,830, Feb. 13, 1967, abandoned, and Ser. No. 689,939, Nov. 24, 1967, Pat. No. 3,429,013.

[52] U.S. Cl. ................................................227/120
[51] Int. Cl. ...............................................B27f 7/02
[58] Field of Search.........................227/1, 5, 6, 7, 8, 227/21, 48, 76, 120, 130, 153; 29/432, 434, 464

[56] References Cited

UNITED STATES PATENTS

| | | | |
|---|---|---|---|
| 2,886,815 | 5/1959 | Young | 227/120 |
| 3,319,864 | 5/1967 | Adams | 227/76 |
| 3,429,013 | 2/1969 | Pabich et al. | 24/221 |

Primary Examiner—Granville Y. Custer, Jr.
Attorney—Alter, Weiss & Whitesel

[57] ABSTRACT

Tool attachments associated with air tools that force nails or other fasteners into members. Uniquely formed wing headed fasteners and the tool attachments are correspondingly adapted to each other to enable the wing headed fasteners to be pivotally mounted to said members with the nails from the tool for releasably holding a first member, such as a cabinet backing in a position relative to a second member such as a cabinet frame therebehind. The attachments are associated with air tools, or the like, to force nails through uniquely formed wing headed fasteners to hold same so that the wing headed fasteners are pivotally mounted to a member to releasably hold a first member such as a cabinet backing in a position relative to a second member such as a cabinet frame therebehind.

16 Claims, 22 Drawing Figures

PATENTED APR 17 1973

INVENTOR
RICHARD W. PABICH
RICHARD W. TREIBER

BY
*Irwin C. Alter*
ATTORNEY

PATENTED APR 17 1973 3,727,821

INVENTORS
RICHARD W. PABICH
RICHARD W. TREIBER
BY
*Alter and Weiss*
ATTORNEYS

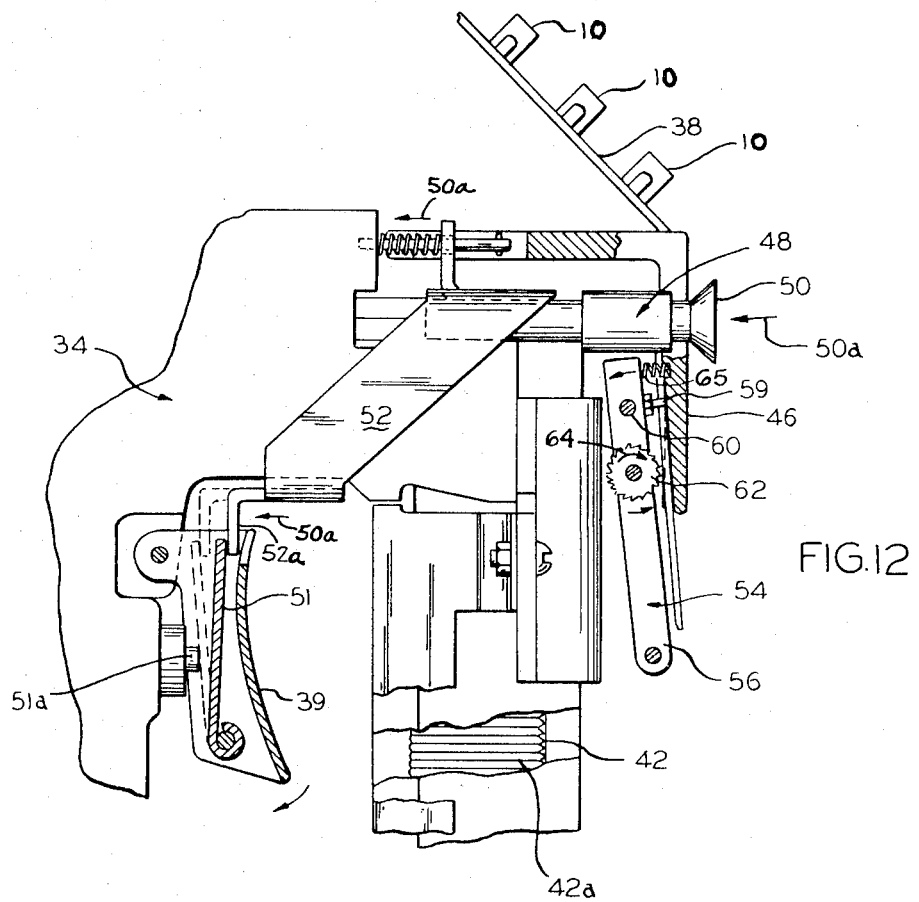
FIG.12
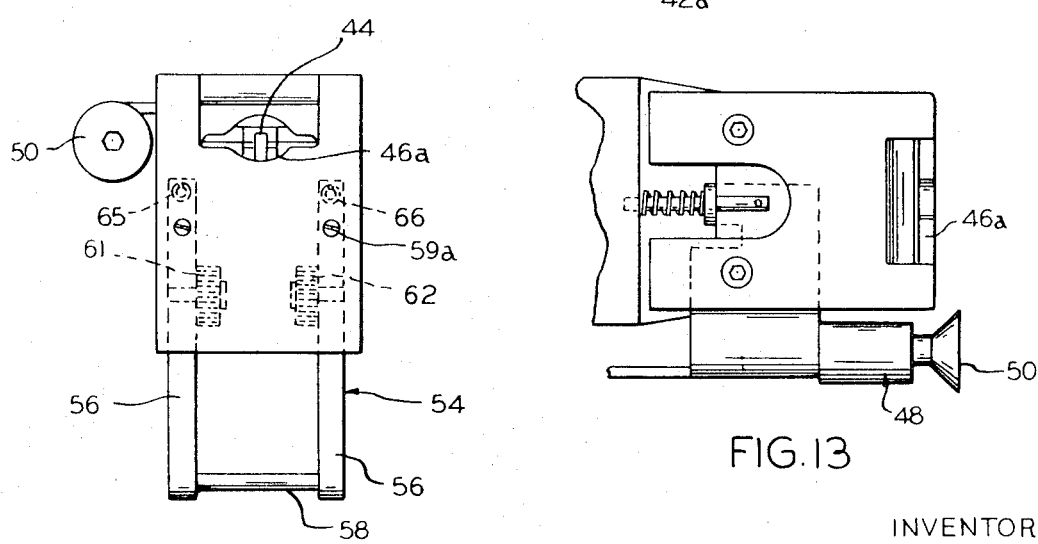
FIG.14
FIG.13

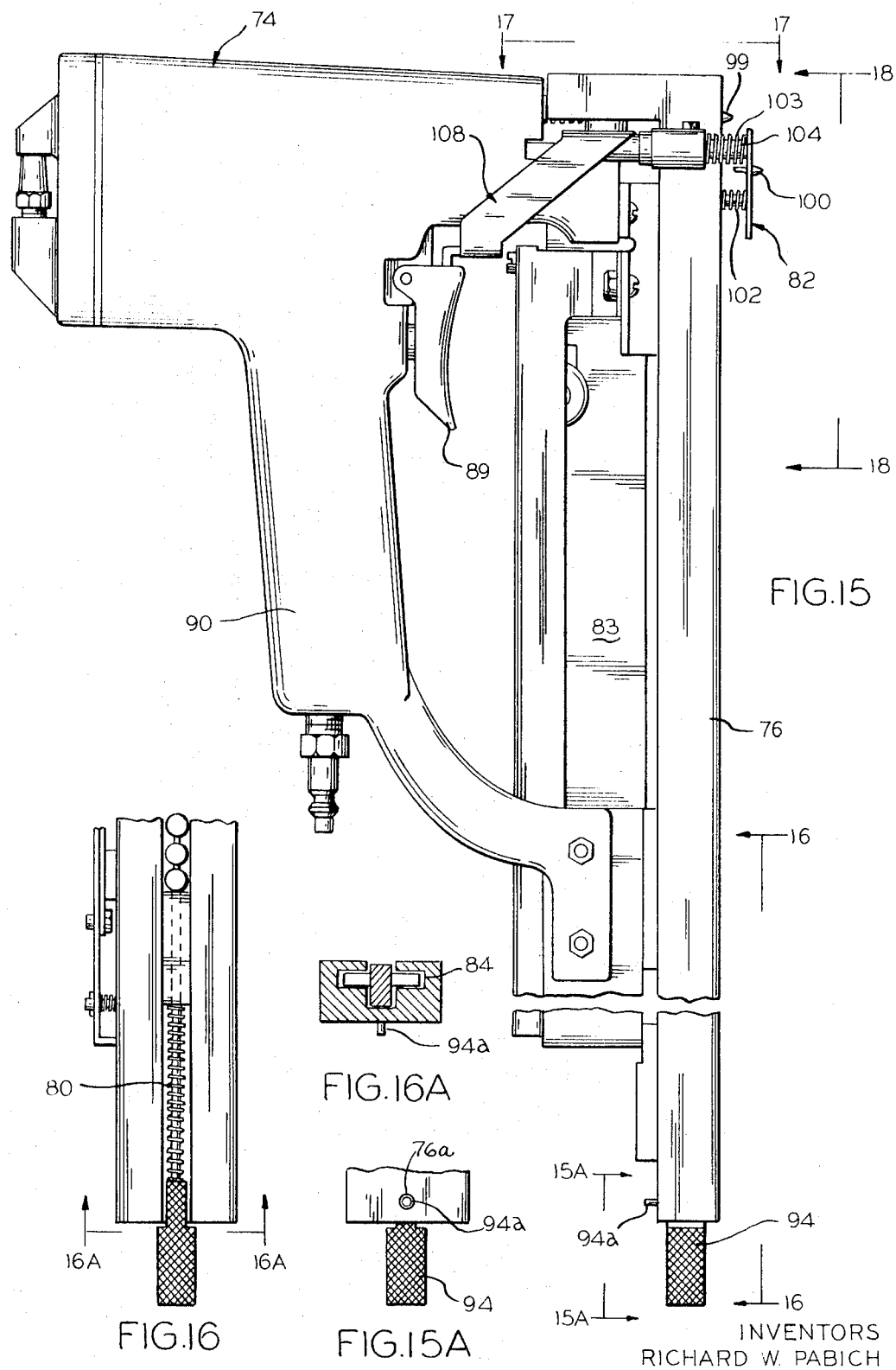

INVENTORS
RICHARD W. PABICH
RICHARD W. TREIBER

BY *Alter and Weiss*

ATTORNEYS

TOOL FOR ATTACHING IMPROVED WING HEADED FASTENERS

This invention relates to improved wing headed fasteners, tool attachments and to the method of applying the wing headed fasteners with a minimum of cost and time. This is a continuation in part of our previously filed and since abandoned patent application entitled IMPROVED WING HEADED FASTENER AND TOOL ATTACHMENT FOR APPLYING FASTENER, Ser. No. 615,830, Filing Date Feb. 13, 1967, as well as our previously filed continuation in part entitled IMPROVED WING HEADED FASTENER WITH TOOL ATTACHMENTS AND METHOD FOR APPLYING FASTENER, Ser. No. 689,939, Filed Nov. 24, 1967 now U.S. Pat. No. 3,429,013.

For many years the electronics industry, among others, has been faced with the problem of reassembling imperfect units such as television sets after the same have been assembled. Of principal concern is the necessity of removing and thereafter replacing threaded fasteners which are normally used in fastening the backing members of television cabinets, or the like. The cost involved in the operations adds considerably to the unit cost of the product being manufactured and thus there is a definite need for obviating the removal and replacement of the threaded fasteners.

Several attempts have been made in the past to remedy this problem by using fasteners which do not have to be removed from the cabinet in order to enable removal of the cabinet backings which they secure. Such fasteners do exist and although they obviate problems of removal, it is more difficult to install these new fasteners than it is to install the old and well known threaded fasteners.

As explained in our previous application, we have obviated the disadvantages attendant with utilizing common threaded fasteners for securing first members, such as cabinet backing members, to second members, such as cabinets, by providing fasteners which enable the backing of a cabinet to be removed expeditiously without removal of the fasteners. In addition, the fasteners can be positioned and applied automatically with our new process thereby obviating the difficulties involved with initially applying or installing the fasteners. It was thus a primary object of our invention covered under U. S. Patent application, Ser. No. 689,939 (now U.S. Pat. No. 3,429,013) to provide new and improved fasteners which can removably associate a cabinet backing or the like, with a cabinet so that the backing can be assembled and disassembled with a minimum amount of time and effort. It was a further object of this invention to provide new and improved fasteners that removably associate a cabinet backing, or the like, with a second member such as a cabinet in order that the backing can be removed from the cabinet without removal of said fastener.

While we disclosed attachments in our previously filed applications, such attachments were considered a distinct invention and to this end we here disclose those portions of the previous applications which were considered as distinct inventions. Thus, it is a primary object of this invention to provide tool attachments for tools used for automatically driving nails. The attachments are especially adapted to our new and improved fasteners so that the fasteners can be pivotally associated with members by driving nails therethrough and into said members.

It is even a still further object of our invention to provide new and improved attachments for an air tool to thereby adapt the tool especially for our new and improved fasteners and the attachments enable our new and improved fasteners to be associated with members at a predetermined location with respect to key slots in those members.

It is even still further an object of this invention to provide a new and improved system for positioning fasteners such as described herein with respect to nail driving tools in order to associate the fasteners with members by driving nails therethrough.

Other and further objects of this invention will become readily apparent from reading the description in light of the accompanying drawings wherein:

FIG. 12 is an enlarged side elevational view of the improved tool attachment used to cooperate with the carrier tape and fasteners illustrated in FIG. 9;

FIG. 13 is a fragmentary elevational view of our device illustrating a spring biased catch that prevents nails from being actuated from the device until after the tool is positioned so that a fastener may be properly positioned in a key slot; and FIG. 14 is an enlarged bottom view of the attachment for the embodiment illustrated in FIG. 9;

FIG. 15 is a side elevational view illustrating still another embodiment of our invention with an automatic nailing tool where the improved fastener utilized is interconnected;

FIG. 15A is a fragmentary view taken on a plane passing through the line 15A—15A and looking in the direction of the arrows;

FIG. 16 is a partial bottom view taken on a plane passing through the line 16—16 and looking in the direction of the arrows and illustrating the fasteners interconnected and positioned in our device as illustrated in FIG. 15;

FIG. 16a is a sectional view taken on a plane passing through the line 16A—16A (of FIG. 16) and looking in the direction of the arrows;

Figure 2:
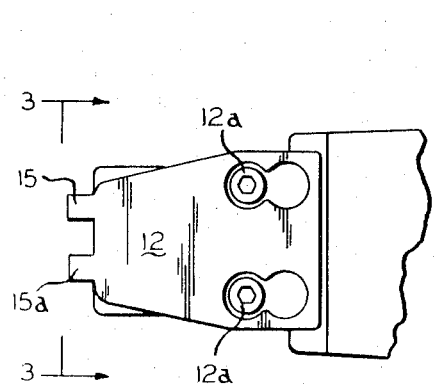
FIG. 2 is a front view of the tool attachment of our invention illustrating its mode of association with the automatic nailing tool of FIG. 1.

Referring to the drawings, wherein like characters of reference indicate corresponding parts throughout our new and improved wing headed fastener 10 and tool attachment 12 are shown in FIGS. 1–8 in connection with an air tool which is commonly used for driving nails. Exemplary embodiments thereof have heretofore been illustrated and described in U.S. Pat. Nos. 2,872,901 3,081,740, 3,081,741, 3,081,742, 3,056,964, 3,056,965.

Figure 1:
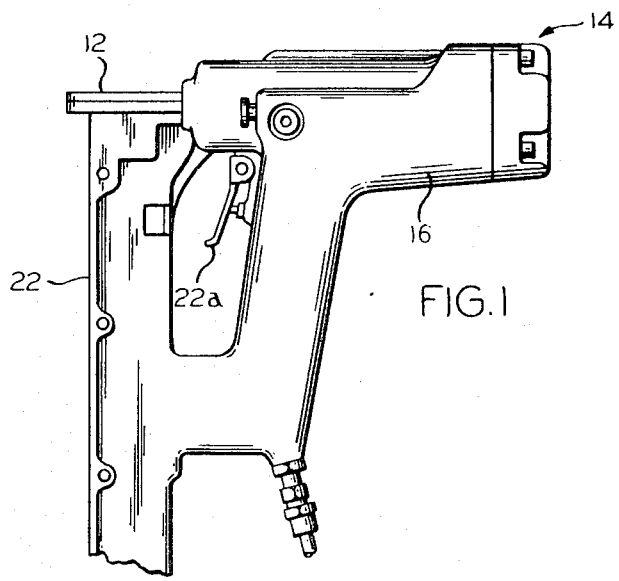
FIG. 1 is a side elevational view illustrating our invention used with an automatic nailing tool that is powered by compressed air.
Figure 3:
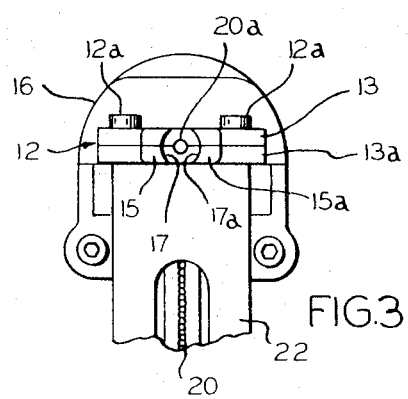
FIG. 3 is a bottom view looking upward at the tool attachment of our invention in relation to the bottom of the automatic nailing tool of FIG. 1.
Figure 8:
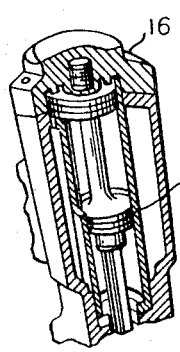
FIG. 8 is a cut-away view of the actuating piston member of the air tool illustrated in FIG. 1.
Figure 11:
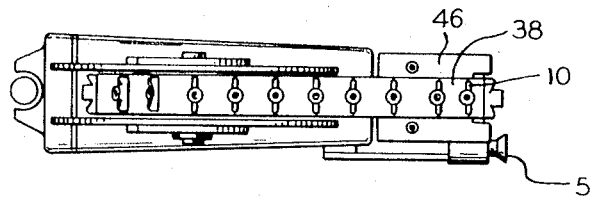
FIG. 11 is a top view of FIG. 10.

As illustrated in FIGS. 1, 3 and 8, the air tool 14 has a cylinder head 16 that is supplied with compressed air to drive a reciprocating piston 18 in order that nails 20 which are held in the magazine 22 thereof are forced through an aperture 20a in the tool attachment 12. It will be noted that the tool attachment 12 is associated with the lower portion of the air tool 14 by fastening members 12a. The tool attachment 12 comprises a pair of apertured plates 13, 13a. The plates fit together and form the aperture 20a therebetween for purposes of enabling the nails 20 in the magazine 22 to be forced therethrough by the piston 18 upon actuation of the trigger 22a of the air tool 14. The attachment 12 has a pair of spaced apart noses 15, 15a, which have inner sides with opposing arcuate edges 17, 17a to receive and hold the wing headed fasteners 10 in position in connection with the air tool 14 as will be hereafter explained.

Figure 7:
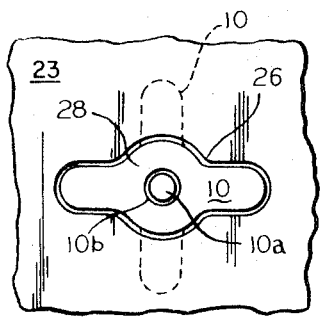
FIG. 7 is a view illustrating our new and improved wing headed fastener in relation to the key slot in the cabinet backing where the wing headed fastener has an open position (shown by the solid lines) and a closed position (shown in phantom)

The wing headed fasteners 10, as illustrated in FIGS. 4–7, are intended for use in cooperation with a first member, such as a cabinet backing 23 to removably associate the backing with a second member such as a cabinet 24 in order that when it is desired to remove the cabinet backing, the same can be removed without removing the fasteners. The first member or cabinet backing 23 has a key slot 26 which substantially conforms to a cross-section of our new and improved wing headed fastener 10 as illustrated in FIG. 7.

Figure 6:
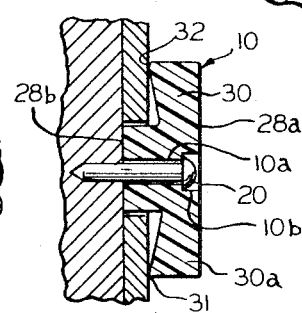
FIG. 6 is a sectional view similar to FIG. 4 illustrating how our new and improved wing headed fastener is held in position with the wing head substantially transverse to the key slot with its wing portions forced against the backing surface by a nail.

As illustrated in FIGS. 6 and 7, the wing headed fastener 10 has a central body portion 28 with top and bottom ends 28a, 28b, respectively. A pair of wing portions 30, 30a, project from the central body portion in opposite directions. The wing portions preferably have flat upper ends and inclined lower ends 31, 32 having the lowest points thereof at the outside and rising upwardly at points closer to the central axis thereof. The wing portions 30, 30a are preferably composed of resilient material such as plastic and the lowest points thereof are accordingly deflected upward toward the top end of said wing headed fastener when forced against the cabinet backing 23. Such deflection causes pressure to be exerted on the surface underneath the fastener to secure the fastener and fastened member.

Figure 4:
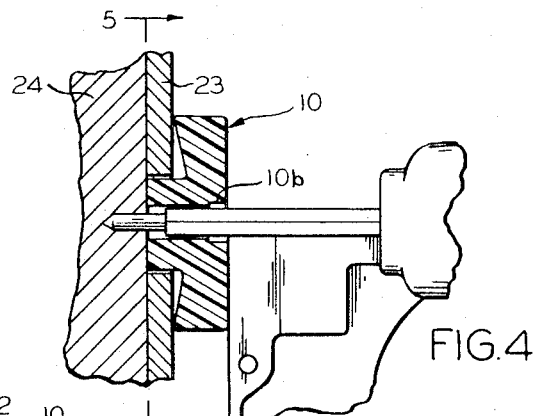
FIG. 4 is a sectional view illustrating how a nail fastener is forced through one of our new and improved wing headed fasteners to secure the same to a first member such as a cabinet frame.

It will be noted from FIGS. 4 and 6 that the lower ends of the wing portions 30, 30a are rounded so that when it is desired to rotate the fastener, friction is minimized. Also, the central body portion 28 has an opening 10a with a recess 10b formed therein through the central axis thereof from the top to the bottom for receiving a nail 20 in order to attach the wing headed fastener 10 to the said second member.

Figure 5:
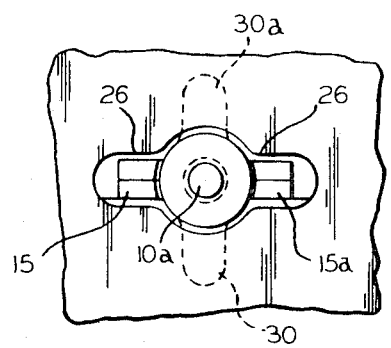
FIG. 5 is a sectional view taken along a plane passing through the lines 5—5 in FIG. 4 and looking in the direction of the arrows to illustrate how the new and improved tool attachment cooperates with a key slot to locate the wing headed fastener and nail in a certain position relative to said key slot.

In operation, the air tool 14 with its magazine filled with nails 20 has an improved wing headed fastener 10 releasably held by the attachment 12 as illustrated in FIG. 5. The central body portion 28 of the fastener 10 is held by the arcuate edges 17, 17a so that the aperture 10a in the wing headed fastener 10 is aligned with the intended path of the nails 20. Thereafter the noses 15, 15a of the tool attachment 12 are positioned in the key slot 26, as illustrated in FIG. 5 in order that the wing headed fastener has its wing portions 30, 30a positioned substantially transverse to the key slot 26 and therefore in contact with the backing member 23 of the cabinet 24. Thus, when the air tool 14 is actuated a nail 20 is forced through the aperture 20a, the aperture 10a of the wing headed fastener 10 and finally into engagement with the cabinet 24 as illustrated in FIGS. 4 and 6. When a nail 20 is driven through a wing headed fastener 10 which is releasably held by the attachment 12, it also causes the wing headed fastener to be released from the arcuate edges 17, 17a.

The wing headed fastener's open and closed positions are illustrated in FIGS. 5 and 7. In FIG. 7, the wing headed fastener is in its open position and is in alignment with the key slot 26 in order that the backing 23 can be removed from the cabinet without removing the fastener 10. The wing headed fastener's closed position is illustrated in phantom in FIG. 5 and 7 where the wing portions thereof are in contact with the backing of the cabinet in a substantially transverse position with respect to the key slot in order to secure the backing 23 to the cabinet 24. It will be further noted that in order to enable easy rotation of the wing headed fasteners the nails 20 are driven into the cabinet a predetermined distance which gives optimum pressure on the wing headed fastener in addition to allowing selected rotation thereof, when this is desired.

In FIGS. 9 through 14, an automatic nailing tool 34 is illustrated in combination with a roll 36 of flexible carrier strip material, such as the tape 38, that has the wing headed fasteners 10 of this invention mounted thereon in spaced apart relationship. The roll of material 38 enables the wing headed fasteners 10 to be automatically moved to a position where they can be applied rapidly and efficiently as will be explained hereafter.

Figure 9:
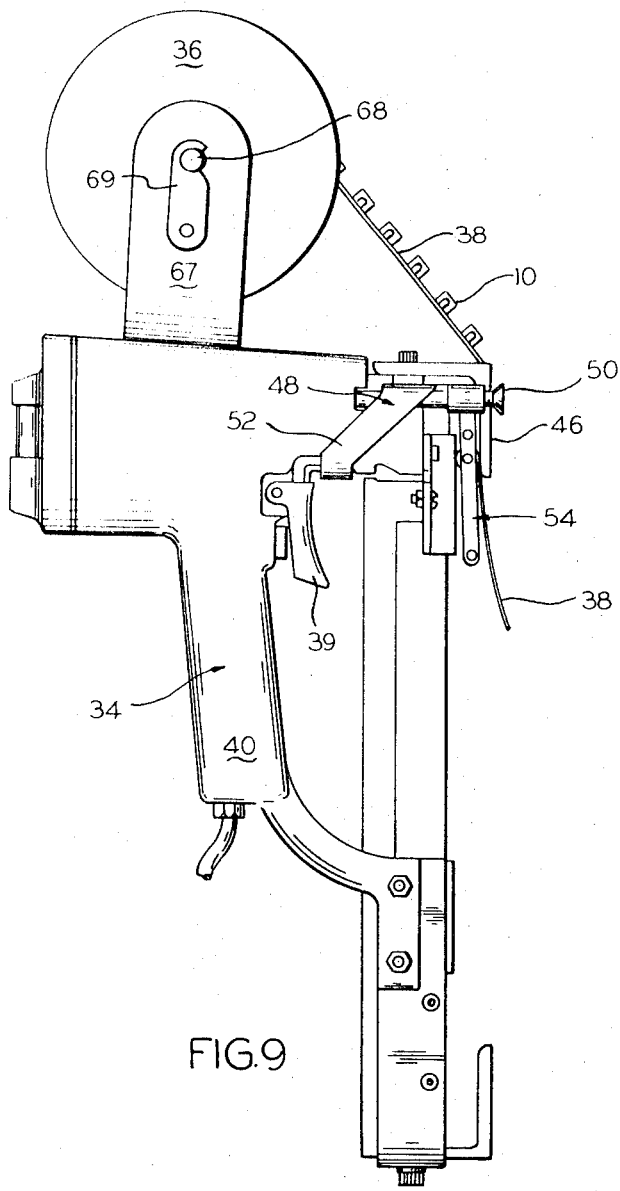
FIG. 9 is a side elevational view illustrating another embodiment of our invention with an automatic nailing tool where the improved fastener is illustrated as mounted in spaced apart relationship on a carrier tape.
Figure 10:
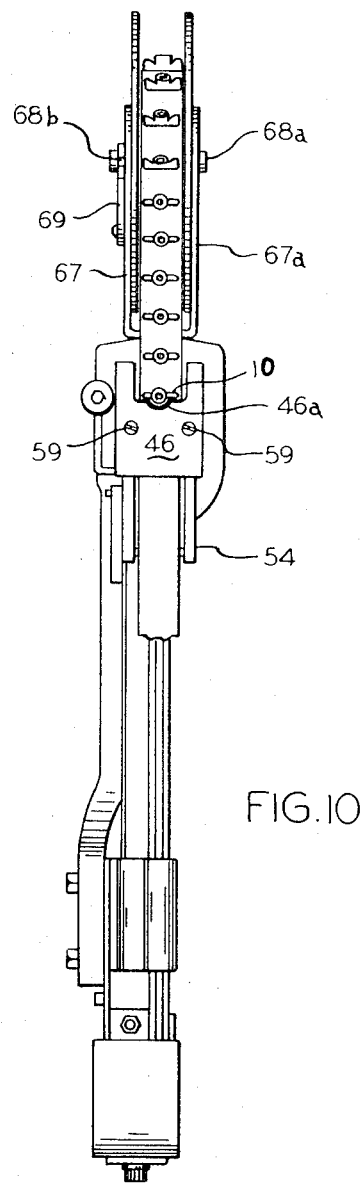
FIG. 10 is a bottom view of FIG. 1.
Figure 17:
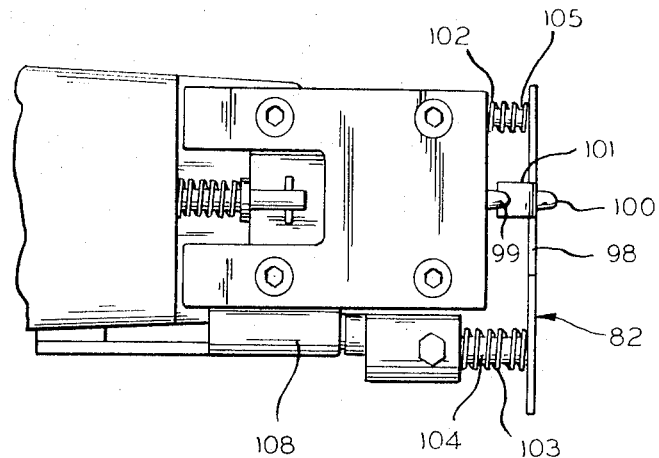
FIG. 17 is a partial front elevational view taken on a plane passing through the line 17—17 (of FIG. 15) and looking in the direction of the arrows.
Figures 19, 20:
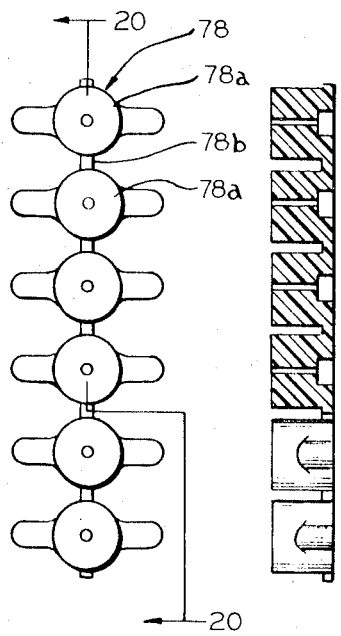
FIG. 19 is a top view of our new and improved fasteners shown interconnected so that they can be utilized in our new and improved device of FIG. 15.
FIG. 20 is a sectional view taken on a plane passing through the line 20—20 (of FIG. 19) and looking in the direction of the arrows.

The nailing tool 34 is patterned after the conventional nailers illustrated in the aforementioned patents and described in connection with FIGS. 1-8. The tool is provided with an actuation trigger 39, a handle 40, a nail clip 42 with nails 42a positioned therein in order that they can be driven through the mouth 44 of the tool. A fastener plate 46 is attached to and positioned on the bottom of the tool 34. The fastener plate 46 has a characterized partial aperture 46a which is shaped in conformity with the contour of a side of the wing headed fasteners and is proximately located with respect to the mouth 44 as illustrated in FIG. 10. For easy identification the aperture is outlined by a heavily inked line in FIG. 10. The aperture 46a works as a locating device for the wing headed fasteners 10 in that the tape 38 is threaded through the aperture 46a from the underside of the plate. When pulled over the top of the plate as illustrated in FIGS. 9, 10, the tape draws the fastener tightly against aperture 46a. The tape can be pulled manually through the aperture 46a and is prevented from being pulled any further when a wing headed fastener is moved against the sides of the aperture 46a.

A safety catch 48 (FIG. 12) is associated with the trigger 39 so that the trigger cannot actuate the device unless the tool is held so that one of the wing headed fasteners 10 is positioned in the opening of the key slot 26 as illustrated in FIG. 5. The safety catch 48 has a release lever 50 that is depressible to release said trigger 39. The top to bottom dimension of the wing headed fastener 10, if they are not positioned in the cavity, precludes the release lever 50 from being depressed when the fasteners and machine are pressed against a surface. On the otherhand, if the wing headed fasteners 10 have their body portions 28 located and positioned within the cylindrical opening in the key slot 26 and against the cabinet or second member 24, the release lever 50 is raised and the trigger 39 can be actuated. As seen from the drawings, the release lever 50 of the safety catch 48 is attached to an arm 52 that has an end adjacent to the trigger 39. The arm 52 prevents the trigger from forcing lever 51 against reciprocating piston operating pin 51a unless arm 52 is in its actuated position shown by the broken line drawing of FIG. 12. Thus, the trigger 39 will not release compressed air and drive the fasteners unless the release mechanism 50 is actuated upward in the direction shown by three arrows 50a by the cabinet backing. Therefore, the tool 34 cannot be operated unless the safety catch has its release lever 50 actuated which occurs only when the wing headed fasteners are properly positioned for being fastened into the key slot as intended.

A pawl mechanism 54, as illustrated in FIGS. 9, 10, 12 and 13 prevents the tape from travelling backward once it is pulled through the aperture 46a. Thus, the mechanism 54 operates to prevent backlash or backward travel of tape 38, after a wing headed fastener 10 has been fastened onto a cabinet.

As illustrated in FIGS. 9, 11, 12 and 14, the pawl mechanism 54 is pivotally mounted above the upper portion of the fastener plate 46 and it includes a pair of spaced apart lever bars 56 which are held together in a spaced apart relationship by means of the transverse bar 58. The mechanism 54 is attached to fastener plate 46 with any well-known threaded fastener such as screws 59, 59a. The screws 59 attach to pivot points 60, which can be cylindrical shafts rotatably mounted in each arm 56. Gripping means such as the gears 61, 62 are rigidly associated with each of the arms 56.

Spring biasing means 65, 66 urge the mechanism 54 with its gear 61, 62 downward into engagement with the tape 38 which is thus held against the fastener plate 46 and prevents back tracking. While the gripping mechanism of FIG. 14 may operate in a number of different ways, a typical operation is for the operator to manually pull the tape 38 and bring a fastener 10 into the aperture 46(a) of FIG. 10. The springs 65, 66 push the gears 61, 62 down to roll on top of the tape 38, and then lock in position to hold it in the taut position. After the fastener is nailed in place the tape 38 is again pulled manually, and the gears 61 and 62 again grip it to prevent a backward movement of the fastener. Alternatively, mechanism may be provided for pulling the tape or moving the gears 61, 62.

Any suitable type of bracket can be employed to journal the roll 36. In FIGS. 9 and 10 a pair of brackets 67, 67a can be attached to the nailing tool 34 and the roll 36 can be locked into rotating position by means of a spindle 68 and catch 69. From FIGS. 9 and 10 it is seen that the spindle 68 is shaped like a bolt with a head 68a at one end thereof and a groove 68b at the other end thereof to engage the catch 69. Thus, to replace the roll 36 the spindle 68 can be removed by releasing the catch 69, removing the spindle 68, placing a new roll in the device, replacing the spindle in the brackets to journal the new roll and then locking the catch 69 with the groove 68a of the spindle 68. Thus, in operation the device illustrated in FIGS. 9 through 13 is operated by first loading the roll of tape with the wing headed fasteners in the machine, then threading a free end of the tape through the aperture 46a and over the fastener plate 46 until the first wing headed fastener is received in the aperture 46a as illustrated in FIG. 10. Then the device 34 is positioned by eye so that the body portion 28 of the wing headed fastener protrudes through the key slot 26 in the cabinet backing 23 with the wing portions 30, 30a thereof in a substantially transverse relationship with the key slot 26 as illustrated in FIGS. 6 and 7. In this position the safety catch 48 is depressed far enough by the pressure from the tool to enable actuation of the trigger 39. After the trigger 39 is actuated a nail 20 is forced through the mouth 44 of the device as well as through the tape 38 and the opening of the central body portion of the wing headed fastener 10 to thereby affix the wing headed fastener to the cabinet, or the like. Almost any spaced apart relationship between the wing headed fasteners 10 along the tape 38 would be suitable for our invention. The only limitation on the space there between is that the wing headed fasteners must be spaced apart a sufficient distance to enable one to be fastened without effecting the next fastener on the tape.

The wing headed fasteners 10 of this embodiment are attached to the tape 38 by means of an adhesive, the adhesive being of a strength that permits the wing headed fasteners 10 to be separated therefrom when a nail is driven therethrough. Still even further relative to the tape roll, in order to separate the wing headed fasteners from the tape by driving nails from the machine, the wing headed fasteners 10 are attached to the tape and rolled in such a manner so that the wing headed fasteners 10 are below the tape when each of them are disposed underneath the mouth 44 of our device and ready for actuation. Thus, when a nail is driven through a wing headed fastener 10, the nail pierces the tape 38 and then causes the wing headed fastener 10 to be separated from the tape and fastened in operative position in the key slots 26 of a cabinet backing, or the like.

In FIGS. 15–18, an automatic nailing tool 74 is illustrated in combination with attachments that include a slotted compartment 76 at the bottom thereof that slidably receives a set 78 of interconnected fasteners 78a therein. The interconnected fasteners 78a are spring biased on one end by the spring means 80 and are stopped at the front end by a fastener plate 81. A cut-off means 82 is located proximate to the fasteners at the front end of the set of fasteners and enables each of the individual fasteners 78a to be severed after they are positioned for fasteneing by the nails as will be explained hereafter.

Figure 18:
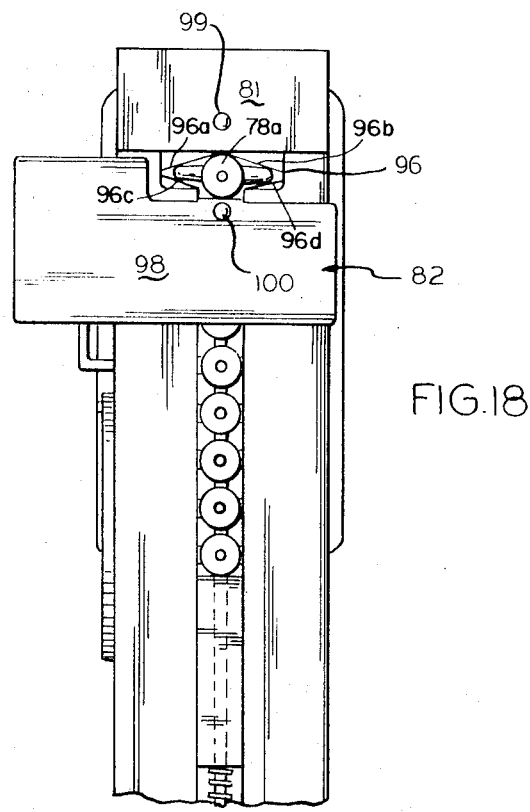
FIG. 18 is a partial bottom view of FIG. 15 taken on a plane passing through the line 18—18 and looking on the direction of the arrows.

The nailing tool 74 is patterned after the conventional nailers illustrated in the aforementioned patent and described in FIGS. 1–15. The tool is provided with an actuation trigger 89, a handle 90, a nail clip 83 with nails positioned therein (not shown) in order that they can be driven through the mouth of the tool. The slotted compartment 76 has a channel 84 which is shaped in conformity to the cross-section of the fasteners as illustrated in FIG. 16a, and it has an opening in the rear end thereof which accepts the set of fasteners 78a upon their insertion therein. The spring means 80 is held in place at the rear end of the machine by means of the spring catch knob 94 which has a peg 94a extending therefrom that is placed in a protruding position through the aperture 76a. The slotted compartment 76 has a characterized aperture 96 at the front end thereof which is shaped in substantial conformity with the contour of one of the wing headed fasteners and is proximately located with respect to the mouth of the machine in order that its position is in registry with the mouth so that a nail can be driven through the aperture of the fastener. The fastener plate 81 cooperates with the characterized aperture 96 to locate the fastener 78a for activation as illustrated in FIG. 18. In this particular embodiment, the characterized aperture is defined by shoulders 96a, 96b on the tool and shoulders 96c, 96d on the front of the magazine. It will be noted that the cut-off means 82 has a bottom plate 98 which has a protrusion 100 extending downward therefrom as well as cutter 101 extending upward toward the interconnecting means 78b of each of the fasteners 78a as they are positioned in the characterized aperture 96. The cut-off means 82 is spring biased in a downward direction by the spring means 102 and 103 which are interposed between the machine and the cut-off means 82 at a location where a pair of reciprocally actuatable piston members 104 and 105 extend from the nailing tool. At least one of the reciprocally actuatable piston members, such as 104 is connected to the safety catch 108 of the nailing tool 74 so that the trigger cannot actuate the device unless one of the wing headed fasteners is positioned in the opening of a key slot 26 as illustrated in FIG. 5. The safety catch 108 is associated with the trigger 89 so that the trigger cannot actuate the device unless one of the wing headed fasteners is positioned in the characterized aperture 96 as illustrated in FIG. 18. The safety catch 108 is associated with the release lever or piston 104 to release the trigger 89 when the piston is depressed.

Briefly in resume, if the winged fastener is not present, the parts 48, 50, 52, 52a are in the positions shown by solid lines. When the trigger is pulled, the left-hand end of arm 51 is raised (as viewed in FIG. 12). The arm 51 pivots about the point where it is resting on the arm 52a. However, arm 51 does not raise far enough to move pin 51a. If a fastener 10 is in position, parts 48, 50, 52a raise, as indicated in dotted lines in FIG. 12. When the trigger 39 is pulled, the left-hand end raises. The lever 51 pivots about the point where it is resting on the arm 52a. This time the pin 51a is pushed, and the tool is actuated.

As in the case of the other preferred embodiments of the nailing tools, the top to bottom dimension of the wing headed fasteners 78a, if they are not positioned in the key slot, precludes the release lever or piston 104 from being depressed when the fasteners and machine are pressed against a surface unless the wing headed fasteners 78a have their body portions located and positioned within the cylindrical opening in the key slot and against a base member. If the fastener 78a is not properly positioned in the key slot, the height of the fastener body interfered with a movement of the plate 82, to thereby preclude a release of safety catch 108. This is explained above in connection with FIG. 12. Thus, the tool 74 will not operate unless the safety catch 108 has its release lever or piston 104 actuated which occurs only when the tool is positioned against the back of the cabinet and the wing headed fasteners are properly positioned for being fastened into the key slot as intended.

Still further, a protrusion 99 extends from the fastener plate so that it can cooperate with the protrusion 100 to be constrainingly received in a key slot to locate the improved fasteners 78a in a predetermined location relative to the key slot and to locate the fastener in order that it can be forced against a cabinet backing, or the like, upon actuation of a nail.

To review the operation of the tool 74 and attachments thereof, the set of interconnected fasteners 78 are placed in the slotted compartment 76 and the spring means 80 is urged against the interconnected fasteners 78 to position them successively for activation and fastening. The cutoff means 82 operates to sever each of the fasteners 78a prior to their being nailed. As each fastener 78a is nailed, another fastener is actuated by the spring means 80 to a position where it is in the characterized aperture 96 and ready for nailing. The fasteners are located by means of the protrusions 99, 100 as before described.

Thus, from an understanding of the operation of our invention it can be seen that the invention has fulfilled the stated objects in a remarkably unexpected fashion. Not only does the new and improved wing headed fastener enable expeditious removal of the cabinet backings, or the like, but also the new and improved attachments and process described herein in connection with the fasteners enables the wing headed fasteners to be installed easily, rapidly and with a minimum of cost.

While we have illustrated preferred embodiments of our invention, the scope thereof is intended to include other embodiments which are suggested by this disclosure. For instance, it is conceivable that other shapes of attachments for associating the wing headed fasteners with driving tools could be employed to achieve the objectives herein disclosed and suggested.

Having thus described our invention, what we claim and desire to secure by United States Letters Patent is:

1. A tool that drives nails into a base member, means in said tool for removably holding a wing headed apertured fastener in a position where said aperture is aligned with the intended path of said nail, whereby the driving of said nail moves said fastener out of said tool by forcing said nail through said aperture and into said base member.

2. A tool as defined in claim 1, for use in removably connecting a panel member having a key slot therein to said base member,
   locating means shaped to be received in said key slot to locate said fastener in a predetermined location relative to said key slot and to locate said fastener in order that it can be secured to said base member upon the driving of said nail.

3. A tool as defined in claim 1
   said tool having magazine means for slideably receiving a strip of interconnected fasteners to successively feed each of said apertured fasteners in alignment with said path of said nails, and said magazine having spring means to successively feed each apertured fastener after a preceding one has been severed from the remaining fasteners,
   whereby the driving of said nails through said apertured fasteners causes said fasteners to be successively secured to said base member.

4. A tool, as defined in claim 3 wherein said tool has cutting means for severing the connection between each of said fasteners prior to when said nails fasten each of said fasteners.

5. A tool as defined in claim 4 for use in removably connecting a panel member having a key slot therein to said base ember,
   locating means shaped to be received in said key slot to locate said fastener in a predetermined location relative to said key slot in order that it can be secured to said base member upon the driving of said nail.

6. A tool, as defined in claim 1, wherein said apertured fasteners are removably mounted in a spaced apart relationship on a flexible stip in order to feed each of said apertured fasteners successively for fastening by said nails,
   said tool having means for slidably receiving said flexible strip in order that said strip can be moved therethrough to successively locate each of said apertured fasteners in alignment with said path of said nails,
   said apertured fasteners being removed from said strip and secured to said base member upon the driving of said nails, and
   said tool being adapted to successively locate each of said apertured fasteners after a preceding one has been removed from said strip by movement of the tape to successively locate each of said apertured fasteners for securement.

7. A tool, as defined in claim 6 wherein said tool includes means for precluding a retrogressive movement of said strip.

8. Apparatus for releasably mounting a panel on a surface, said apparatus comprising means for receiving a strip of fasteners interconnected by a thin integral web, means for locating one of the fasteners in said strip over a mounting surface, means for driving a nail through said one fastener and into said surface, and means operated substantially simultaneously with the driving of said nail for severing the web joining the fastener attached to the surface, thereby separating it from the strip of fasteners.

9. The apparatus of claim 8 in which the nail is disposed over and concentrically aligned with the fastener prior to being driven therethrough and prior to said severing of the web joining the fastener and the strip.

10. The apparatus of claim 8 wherein said driving means is a hammer in said apparatus, said means for receiving the strip of fasteners including spring biased means for urging said strip toward said hammer, magazine means in said apparatus for receiving a strip of nails and urging said nails toward said hammer, and means for operating the hammer to drive a nail through a fastener and into said other surface.

11. A fastener driving tool for automatically feeding a component and fastening the same in position by driving a fastener therethrough into a workpiece, said tool comprising:
   a housing including structure defining a drive track and a fastener driving member movable through said drive track and operable through a drive stroke;
   a magazine assembly including:
   an elongated guide track for supplying one of a continuous separable strip of interconnected components to said drive track, and
   guide means for supplying fasteners to said drive track intermediate said guide track and said fastener driving member;
   whereby operation of said fastener driving member through a drive stroke is effective to drive a fastener through one component into a workpiece and to separate said one component from the strip.

12. A fastener driving tool as set forth in claim 11 wherein said components are generally T-shaped clips, and
   said guide track includes an elongated generally T-shaped guide.

13. A fastener driving tool as set forth in claim 11 and including means for separating said components from said strip.

14. A fastener driving tool as set forth in claim 13 wherein the last mentioned means comprises a shear.

15. A fastener driving tool as set forth in claim 14 wherein said tool is of the type provided with a workpiece engaging member connected to a safety switch preventing firing of said tool through a drive stroke unless said tool is in engagement with a workpiece, and
   wherein said shear is defined on said workpiece engaging member to separate one of said components from a continuous strip upon depression of said member.

16. A fastener driving tool as set forth in claim 12 wherein said clips are adapted to be secured in keyhole shaped slots formed in the edge of a panel, and
a projecting pin is provided from said tool engageable in the narrow portion of a slot to locate the tool and position the assembled component on the workpiece.

* * * * *